Nov. 14, 1950 N. C. BEERLI 2,529,534
ADAPTER
Filed March 20, 1946 3 Sheets-Sheet 2

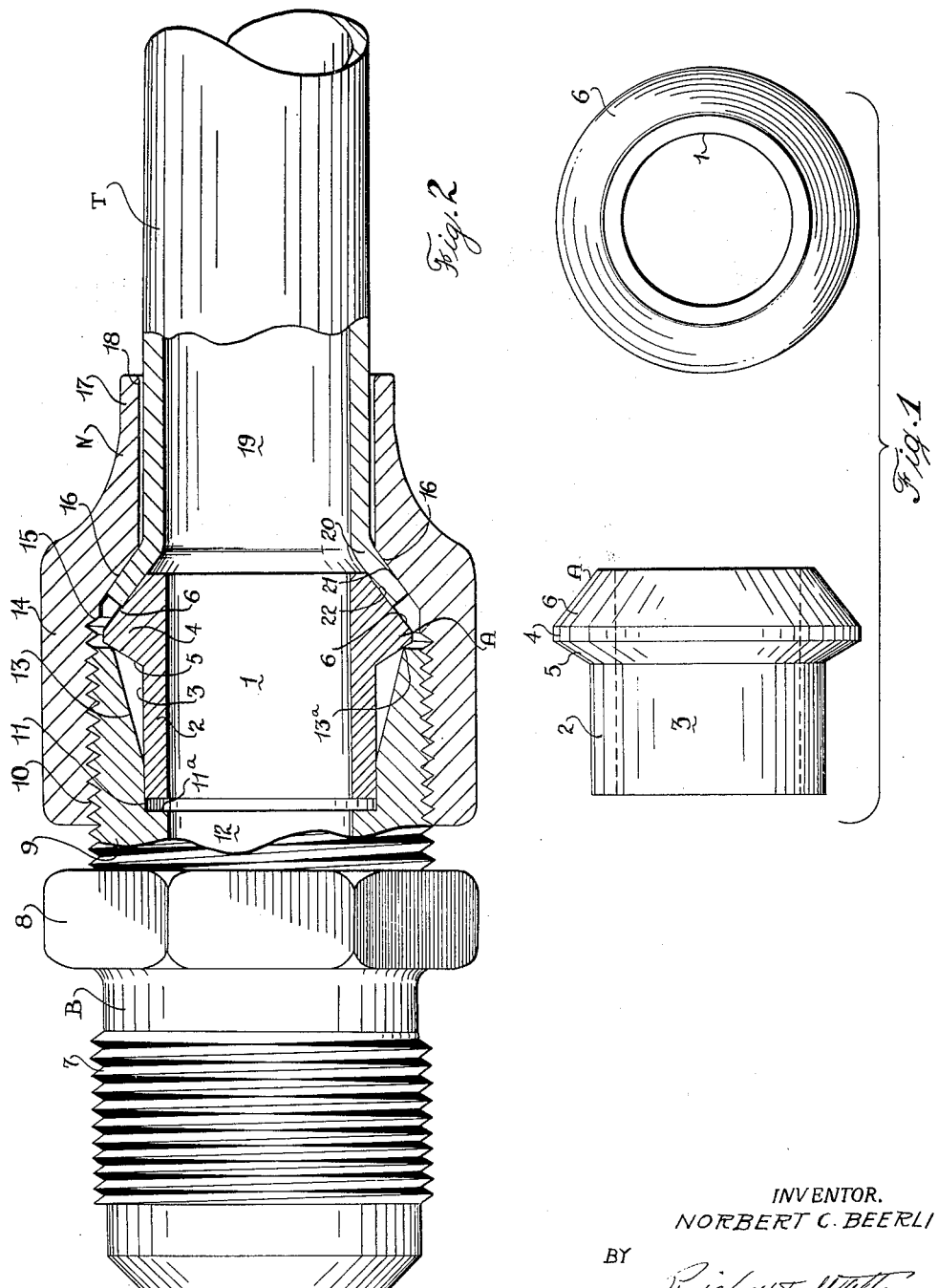

INVENTOR.
NORBERT C. BEERLI
BY
Richey & Watts.
ATTORNEYS

Nov. 14, 1950

N. C. BEERLI 2,529,534

ADAPTER

Filed March 20, 1946

INVENTOR.
NORBERT C. BEERLI

BY
Richey + Watts
ATTORNEYS

Patented Nov. 14, 1950

2,529,534

UNITED STATES PATENT OFFICE 2,529,534

ADAPTER

Norbert C. Beerli, Mayfield Heights, Ohio, assignor to The Weatherhead Company, Cleveland, Ohio, a corporation of Ohio Application March 20, 1946, Serial No. 655,743

3 Claims. (Cl. 285—122)

1

This invention relates more broadly to fittings for pipes and tubing, more specifically to the provision of an adapter device which makes it possible to connect two fittings together which fittings are not manufactured to be used in conjunction with one another.

Recent developments in the fitting art have resulted in the introduction and general adoption of several different types of fittings, all of which are designed to serve the same general purpose. For example, one type of commonly encountered fitting includes a male nipple terminating in a portion with an external conical surface designed to receive a conically flared tube, or to cooperate with a conically flared sleeve on which is mounted a flexible hose. Another type of widely used fitting has a body portion which includes a male nipple formed with a conical surface at the end of the nipple, but in this type of fitting the conical surface is an internal surface designed to receive a tube clamping member. Thus it has been impossible to connect a female portion of the first named fitting, which portion includes an internal conical surface, to the male portion of the second named fitting, which male portion also terminates in an internal conical surface.

This has resulted in considerable inconvenience and loss of time to manufacturers and to service personnel charged with the responsibility of making up and maintaining hydraulic systems, it being common to find one unit built up with one type fittings and the other unit made with the other type of fitting, there being no means to make a connection between them. It is an object of this invention to make it possible to connect two such dissimilar fittings by providing a simple adapter device which will not only permit such a connection but which will give a dependable and fluid tight seal.

It is another object of this invention to provide an adapter which will function satisfactorily but which can be readily machined and which need not be held to close tolerances to produce a fluid tight seal. Other objects and advantages of this invention will become apparent as the following description proceeds.

In the drawings:

Fig. 1 is an external view of an adapter made in accordance with my invention.

Fig. 2 is a cross-sectional view showing how my adapter is used to permit the assembly of flared tube fitting and a nipple designed for another type of fitting.

Figure 3:
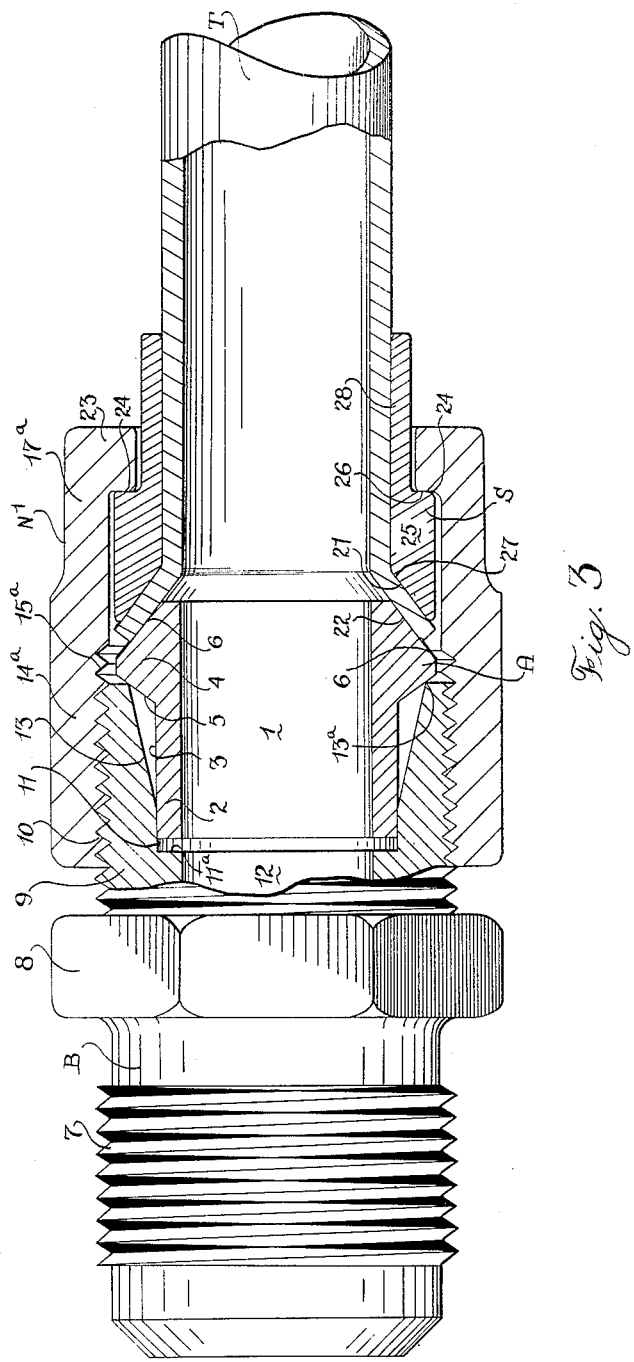
Fig. 3 is a cross-sectional view of my adapter used to connect the flared tube to a fitting not designed to receive the tube, the arrangement being generally like that shown in Fig. 2 except that a separate sleeve is formed and placed against the conical portion of the tube.

Referring now to the drawings, Fig. 1 shows my adapter A which is axially apertured at 1 and which includes a sleeve portion 2 with an external cylindrical surface 3. The sleeve portion 2 joins with an enlarged portion 4 which is formed to have inner conical surface 5 and outer conical surface 6, the vertex angle of the outer conical surface 6 preferably being less than that of conical surface 5.

Fig. 2 shows the adapter used to connect a flared tube to a fitting having a nipple not designed to receive a flared tube. The assembly includes the adapter A, the fitting body B, attaching nut N and a flared tube T. The nipple B has a threaded portion 7 for attaching it to the rest of the system although the means for attaching nipple B forms no part of this invention. Nipple B may also include a polygonal section 8 to receive a wrench and it is formed with an axially extending nipple portion 9 which is provided with external threads at 10. Nipple portion 9 has an enlarged internal bore 11 which merges with a smaller fluid conducting bore 12. The terminal portion of nipple 9 has an internal conical surface 13 which is designed to receive a male sleeve used in conjunction with a certain type of fitting. However, it is desired to use body B with the type of fitting which does not include a sleeve member to cooperate with conical surface 13. Such a fitting includes a nut N with a sleeve portion 14 which is internally threaded as at 15 and which portion is formed with an internal conical surface 16. Likewise, nut N has a shank portion 17 apertured as at 18 to receive the tube T. Tube T has an aperture 19 and a terminal flared conical portion 20 which conical portion has an outer conical surface 21 and inner conical surface 22. When the nut N is tightened the inner conical surface 16 of the nut is forced against the outer conical surface 21 of the flared tube. This presses the flared tube against the adapter A so that the inner conical surface 22 of the flared tube is forced against the outer conical surface 6 of the adapter. This action, in turn, forces the adapter against the nipple B so that the conical surface 5 of the adapter makes a tight engagement with the edge of the internal conical surface 13 in the nipple as shown at 13a. Simultaneously sleeve 2 fits into aperture 11 in nipple B and acts as a pilot or guide for the adapter to keep it from canting during the tightening operation. The diameter of external surface 3 on the adapter is such that a free fit is obtained in the chamber in the nipple. When nut N is tightened securely the edge 13a of the nipple will form a tight seal with conical surface 5 of the adapter. The vertex angle of the conical surface 5 should be such that the sealing takes place at the edge 13a. Although the angle is not critical, it should be large enough so that the surface 5 will not tend to engage with conical surface 13 in the nipple, since in this case relatively little sealing or biting action would be obtained at the edge 13a and the seal would not be satisfactory. On the other hand, the conical surface 5 should not be so steep as to tend to engage the radial edge of the nipple, instead of making a tight biting engagement with the edge 13a formed by the junction of the conical B and the radial edge of the nipple. The other conical surface 6 of the nipple 6 corresponds with that of the standard fitting designed to receive a flared tube. Generally speaking, best results will be obtained if the vertex angle of conical surface 5 is larger than that of conical surface 6.

Referring to Fig. 3, my adapter is shown mounting a flared tube to the same nipple shown in Fig. 2, the only difference being that the attaching nut N1 acts upon a separately formed sleeve S. Except for the modification of the attaching nut and the additional sleeve the assembly is like that shown in Fig. 2. Attaching nut N1 has a threaded portion 14a and internal threads 15a which engage threads 10 on nipple B. The sleeve portion 17a of the nut is formed with a lip portion 23 which has an internal abutment surface 24. Sleeve S is apertured to receive the tube T and has a body portion 25 which has formed thereon an abutment portion 26 which is acted upon by the abutment 24 of the nut. The reduced portion 28 extends through the nut and along the tube for an appreciable distance. Sleeve S has an outwardly flaring conical surface 27 of the same shape as that of the surface 16 in Fig. 2 and the tube T is formed with an outwardly flaring portion having conical surfaces 21 and 22 like those shown in Fig. 2. When nut N1 is tightened in this modification, the sleeve forces the tube against the adapter which, in turn, forces the adapter against the nipple B and the action is like that described in connection with Fig. 2.

Figure 4:
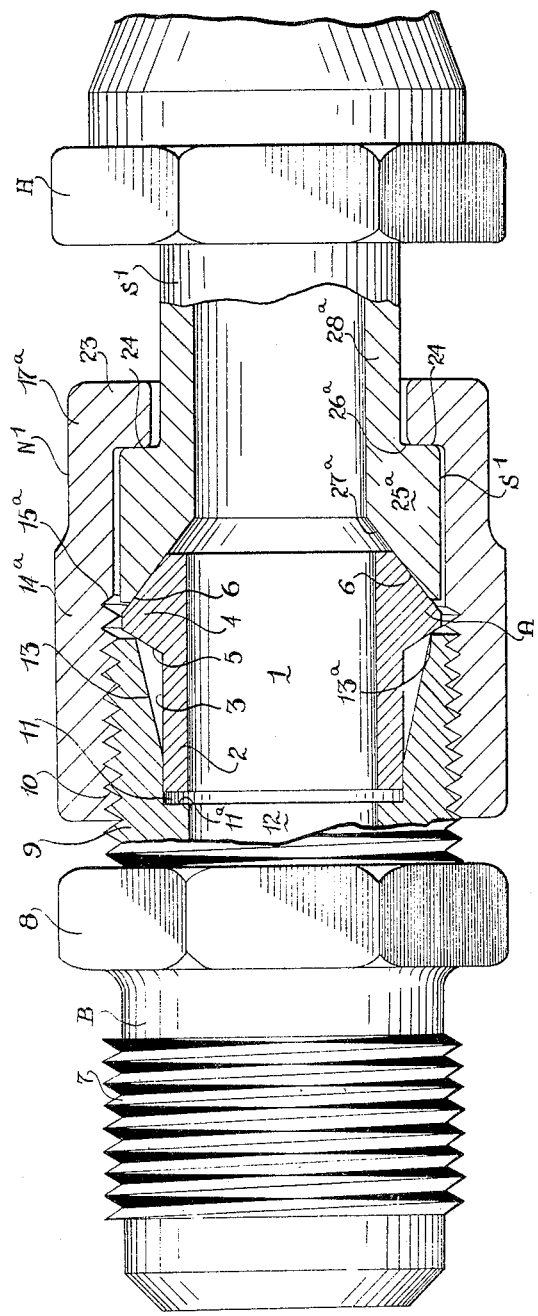
Fig. 4 is a cross-sectional view of my adapter used with a flared sleeve fitting carrying a flexible hose.

Fig. 4 shows my adapter employed to attach a hose end to the nipple B. Here the only difference lies in the extension of the sleeve S1 to receive a hose connection.

The sleeve S1 like sleeve S in Fig. 3 has a body portion 25a formed with an abutment 26a to receive the abutment 24 on the nut N1. Sleeve S1 has an outwardly flaring conical surface 27a which corresponds to the conical surface 6 on the adapter A. Surface 27a is made in accordance with the conventional flared type design. When the nut N1 is tightened, sleeve S1 is forced against the adapter and the action is like that described previously.

Having completed the description of my invention, it can be seen how my adapter permits connection of a pair of dissimilar fittings and how it will produce a good seal. With this arrangement field personnel and others will be able to do service work and make up jobs with existing equipment, which might otherwise require either complete new fitting installations or the ordering of additional parts.

Various modifications can be made in my device without departing from the spirit of the invention. As has been mentioned previously, the exact angle of the conical surface 5 is not critical but there are certain limits within which the angle must be confined. The length of the sleeve portion 2 of the adapter depends largely upon the shape of the nipple B but in no case should the sleeve be long enough so that it butts up against the shoulder 11a of the nipple. If this happens, a tight seal would not be obtained at the edge 13a. The internal diameter of the aperture in the adapter can be varied also, but the external conical surface 6 must be made to conform to the type of fitting with which it is to work. The adapter may be made of a relatively soft or deformable material particularly if it is to be used with brass or aluminum or other relatively soft fittings. The adapter A may also be made of relatively hard material such as steel, which might be desirable in case it would be used with fittings in which nipple or the tube or sleeve, are made up of hard material. These and other modifications will be apparent to those skilled in the art without departing from the spirit of the invention as defined in the appended claims.

Having thus described the present invention so that others skilled in the art may be able to understand and practice the same, I state that what I desire to secure by Letters Patent is defined in what is claimed.

What is claimed is:

1. A fitting comprising an axially apertured body member, said aperture having a cylindrical section and a flaring section leading therefrom terminating in an edge, a fluid-conducting member terminating in a portion having an internal outwardly flaring conical surface, an adapter member having a cylindrical sleeve portion positioned in and guided by the cylindrical section of said body member aperture, said sleeve portion terminating in a radially enlarged portion having axially oppositely facing generally radially extending surfaces, the surface of said adapter facing the sleeve portion being divergent from the flared surface of said body member and making line sealing engagement with said edge thereof, the other generally radial surface of said adapter being conical and making sealing engagement with the conical surface of said fluid-conducting member, and nut means threaded to said body member to clamp the parts together.

2. A fitting comprising an axially apertured body member, said member having a nipple including a portion formed with an internal outwardly flaring surface terminating in an edge, a fluid conducting member terminating in a portion having an internal outwardly flaring conical surface, an adapter member having a cylindrical sleeve portion positioned in the aperture in said body member, said sleeve portion terminating in a radially enlarged portion having two conical surfaces, one of said conical surfaces engaging with said edge of said nipple portion, the other conical surface of said adapter making sealing engagement with the conical surface of said fluid conducting member, and a nut to clamp the parts together, said first named conical surface having a vertex angle greater than that of said outwardly flaring nipple whereby said first-named conical adapter surface makes line contact with the edge of said flaring nipple surface.

3. An adapter formed to permit the connection of dissimilar fittings, said adapter comprising a sleeve portion with an external cylindrical surface adapted to guide said adapter in a fitting body and terminating in a circumferentially continuous generally radially enlarged portion, said enlarged portion having two axially oppositely facing flaring sealing surfaces, that flaring surface adjacent said sleeve portion being adapted to make line contact with the outer edge of a fitting body, the other flaring surface being adapted for sealing engagement with a complementary surface.

NORBERT C. BEERLI.

REFERENCES CITED

The following references are of record in the file of this patent:

UNITED STATES PATENTS

| Number | Name | Date |
|---|---|---|
| 2,271,502 | Snyder | Jan. 27, 1942 |

FOREIGN PATENTS

| Number | Country | Date |
|---|---|---|
| 394,354 | Great Britain | June 19, 1933 |